June 14, 1927.
H. McL. ARMISTEAD
1,632,361
VARIABLE SPACING PLATEN CLUTCH FOR TYPEWRITERS
Filed May 18, 1925
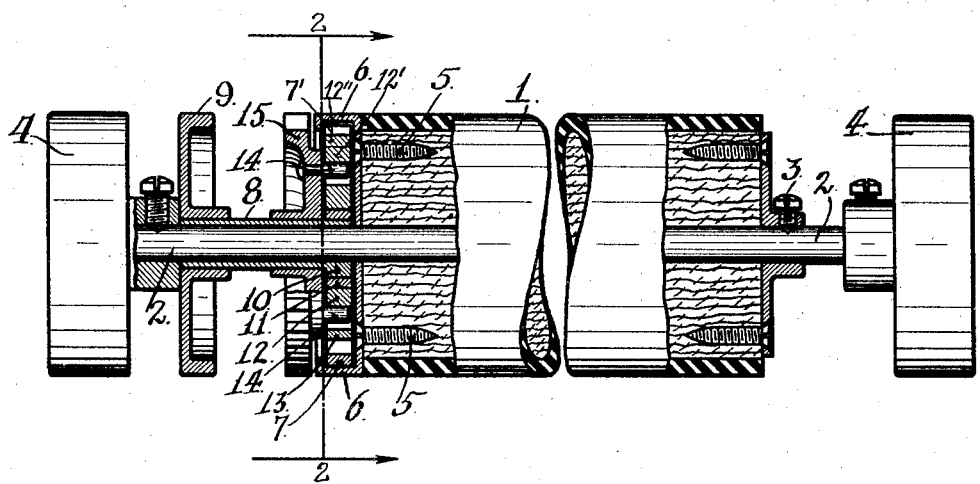
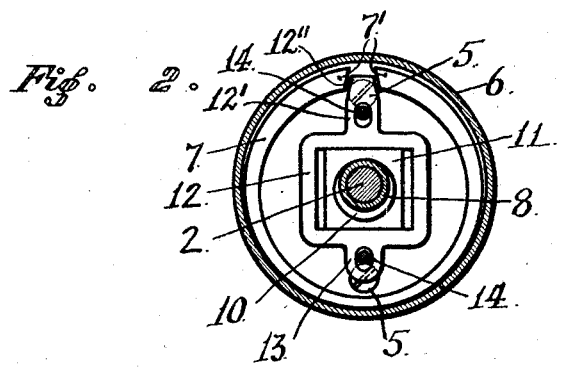
INVENTOR
Hubert McL. Armistead
BY Booth & Booth
ATTORNEYS.

Patented June 14, 1927.

1,632,361

UNITED STATES PATENT OFFICE.

HUBERT McL. ARMISTEAD, OF SAN FRANCISCO, CALIFORNIA, ASSIGNOR TO MANIFOLD IMPRESSIONS CORPORATION, OF CARSON CITY, NEVADA, A CORPORATION OF NEVADA.

VARIABLE-SPACING PLATEN CLUTCH FOR TYPEWRITERS.

Application filed May 18, 1925. Serial No. 30,908.

My invention relates to typewriters and similar type-impression machines, employing means for advancing the paper to and beyond the impression line, by distances regular or varied, to provide for a result commonly known as line spacing definite or variable.

In machines of this nature there is a rotatable platen with associated guides for conforming the paper to an arc of the platen circumference including the line of type impact, the rotation of the platen advancing the paper; and in such machines there are controlling means for effecting and positively making equal the successive arcs of platen revolution, resulting in definite line spacing, and for releasing the platen from such definite control, so that it may be turned at will through any length of arc, in order to provide for variable line spacing, and also to move the paper forward or back ad libitum, for any purpose. These means are usually in the form of a clutch associated with the platen, and with its definite line-spacing control member, adapted to throw said member into and out of function.

My invention concerns such clutch mechanism and it consists in the novel platen-clutch which I shall hereinafter fully describe, it being understood that various changes in form, arrangement and detail may be made to suit different platens and the environment thereof in different machines, without departing from the spirit of my invention as defined by the claims hereunto appended.

One object of my invention is to provide a clutch which is adapted for perfect gripping effect and release upon the application of delicate and convenient force.

Another object is to provide a clutch the functional positions of which are not liable to unintentional or accidental disturbance.

Still another object is to save space in the installation of the clutch.

Other objects will be made manifest in the course of the following specification.

As I have stated, my clutch is adapted for various forms of platens, but for my present purpose I deem it sufficient to describe and illustrate it as associated with a simple form of platen.

In the drawings—

Fig. 1 is a longitudinal section, broken and partly in elevation of a platen showing the application thereto of my improved clutch.

Fig. 2 is a section on the line 2—2 of Fig. 1.

In Fig. 1, the platen 1 which is here indicated in a simple form, is fixed to its shaft 2 by the set screw 3, and said shaft is rotatable, in order to turn the platen, by means of the end knobs 4.

To one end of the platen is fixed by the screws 5, a clutch ring 6, and within said ring is an annular split-clutch shoe 7 adapted by its expansion and contraction to engage and release the clutch ring 6. Fitted for independent rotation upon the platen shaft 2 and extending into the space inclosed by the clutch ring 6 is a sleeve 8, upon the outer end of which is fixed a turning knob 9. Upon the inner end of the sleeve 8 is formed or secured a cam 10 which operates within a compensating block 11. The block 11 is fitted within a yoke 12, the fitting being such, that as shown clearly in Fig. 2, the block may have an independent limited lateral movement in the yoke without affecting the platen shaft, but not an independent vertical movement, the block when moving vertically, carrying the yoke with it up and down.

The yoke 12 is formed with an upper ear 12′ and a lower ear 13, and these ears are slotted, as seen in Fig. 2, upon studs 14 projecting from a ratchet 15 mounted freely upon the sleeve 8, outside of the clutch ring 6, said ratchet constituting the usual definite line spacing control member.

The upper ear 12′ of the yoke 12 is formed or provided with a wedge portion 12″ which is adapted to enter and coact with the complementally tapered severed extremities 7′ of the split clutch shoe 7, Fig. 2.

From the foregoing it will be seen that by a slight turn of the sleeve 8, the cam 10 through the block 11 will cause the slidable yoke 12 to enter its wedge 12″ farther in between the severed ends of the split clutch shoe 7 and will thereby expand said shoe into clutching engagement with the ring 6. Such engagement thus connects the ratchet 15 with the platen, and as said ratchet is, as is common in typewriters, part of the definite line spacing control of the machine, the platen may then be turned, either directly by its shaft knobs or by the usual line spacing lever (not shown) which engages the ratchet, to give such definite spacing as may be provided for by the usual control adjustments.

In order to release the platen for variable spacing, the sleeve 8 is turned back again, and, through its cam 10, the wedging yoke 12 is withdrawn sufficiently to free the clutch shoe 7, which contracting, releases the ring 6 from the ratchet control and, therefore, the platen may be turned by its end knobs through any revolution or arc thereof desired.

I am aware that, heretofore, provision has been made for the release of platens from definite line control, by means of clutches, and that a clutch has been suggested in the form of a split shoe operated by wedging action applied between its severed ends. But in this form just mentioned and in all other constructions of which I have any knowledge, the operation requires a longitudinal movement in the line of the platen axis, which is not desirable for several reasons, such for example, as calling for the grasping of the platen to resist the longitudinal movement of the clutching operation, and moreover, especially in the case of the wedging open and release of a split clutch shoe, there is the liability of jarring disturbance of the completed clutch unless so tightly fitted that its operation is uncertain.

In marked contrast, my clutch being wholly dependent upon a rotary movement, the operating parts may be made with a delicacy of form and with such minimum movement, that the clutch may be applied and released with the least effort and attention. Also by the positive cam control of the wedge yoke, the wedging surfaces may be made abrupt enough to need but minimum movement thereby avoiding clinging together too tightly and still not be liable to jarring displacement. Moreover economy in space is secured.

I claim:—

1. A variable-spacing platen-clutch for typewriters comprising, in combination with a platen, its rotatable shaft and its definite line-spacing control ratchet; a clutch ring associated with the platen; an annular, expansible split clutch shoe within and coacting with said clutch ring; a radially slidable yoke operatively associated with said control ratchet, said yoke having a wedge to coact with the severed ends of the split clutch shoe to effect and control its expansion; and a cam independently rotatable about the platen shaft and operating within said yoke to move it radially.

2. A variable-spacing platen-clutch for typewriters comprising, in combination with a platen, its rotatable shaft and its definite line-spacing control ratchet; a clutch ring associated with the platen; an annular, expansible split clutch shoe within and coacting with said clutch ring; a radially slidable yoke operatively associated with said control ratchet, said yoke having a wedge to coact with the severed ends of the split clutch shoe to effect and control its expansion; a laterally movable compensating block within said yoke; and a cam independently rotatable about the platen shaft, and operating within said block.

3. A variable-spacing platen-clutch for typewriters comprising, in combination with a platen, its rotatable shaft and its definite line-spacing control ratchet; a clutch ring associated with the platen; an annular, expansible split clutch shoe within and coacting with said clutch ring; a radially slidable yoke operatively associated with said control ratchet, said yoke having a wedge to coact with the severed ends of the split clutch shoe to effect and control its expansion; a laterally movable compensating block; a sleeve rotatable upon the platen shaft; and a cam carried by said sleeve and operating within said block.

4. A variable-spacing platen-clutch for typewriters comprising, in combination with a platen member and its independently rotatable definite line-spacing control member; a clutch ring associated with one of said members; a clutch shoe coacting with said clutch ring; means operatively associated with the other of said members and movable radially with respect to said shoe to make and break its clutch engagement with said ring; and means rotatable independently of said members for operating said first named means.

5. A variable-spacing platen-clutch for typewriters comprising, in combination with a platen-member and its independently rotatable definite line-spacing control member; a clutch ring associated with one of said members; an expansible, annular, split clutch shoe coacting with said clutch ring; a radially slidable wedge member operatively associated with the other of said members and adapted to make and break the clutch engagement of said ring and shoe; and means rotatable independently of the platen and of its definite line-spacing member for operating said wedge-member.

6. A variable-spacing platen-clutch for typewriters comprising, in combination with a platen-member and its independently rotatable definite line-spacing control member; a clutch ring associated with one of said members; an expansible, annular split clutch shoe coacting with said clutch ring; a radially slidable yoke operatively associated with the other of said members, said yoke having a wedge to coact with the severed ends of the split clutch shoe to effect and control its expansion; and a member rotatable independently of said platen and line spacing control member and having a cam operating within said yoke to move it radially.

7. A variable-spacing platen-clutch for typewriters comprising, in combination with a platen shaft, a platen member, and an independently rotatable definite line-spacing control member; a clutch ring associated with one of said members; an expansible annular clutch shoe coacting with said clutch ring; a radially slidable wedge yoke operatively associated with the other of said members for controlling the expansion of said shoe; a sleeve rotatably mounted upon the platen shaft; and a cam on said sleeve operating within the wedge yoke to move it radially.

8. A variable-spacing platen-clutch for typewriters comprising, in combination with a platen member and its definite line spacing control member; a clutch ring associated with one of said members; an annular, expansible split clutch shoe within and coacting with said clutch ring; a radially slidable yoke associated with the other of said members, said yoke having a wedge to coact with the severed ends of the split clutch shoe to effect and control its expansion; a laterally movable compensating block within said yoke; and a cam independently rotatable about the axis of the platen member and operating within said block.

9. A variable-spacing platen-clutch for typewriters comprising, in combination with a platen-member, its rotatable shaft and its definite line-spacing control ratchet member; a clutch ring associated with one of said members; an annular, expansible split clutch shoe within and coacting with said clutch ring; a radially slidable yoke associated with the other of said members, said yoke having a wedge to coact with the severed ends of the split clutch shoe to effect and control its expansion; a laterally movable compensating block within said yoke; a sleeve independently rotatable upon the platen shaft; and a cam carried by said sleeve and operating within said block.

In testimony whereof I have signed my name to this specification.

HUBERT McL. ARMISTEAD.